United States Patent [19]

Yamaguchi et al.

[11] 4,275,108
[45] Jun. 23, 1981

[54] LEADER OR TRAILER TAPE FOR A MAGNETIC TAPE

[75] Inventors: Nobutana Yamaguchi; Satoru Takayama; Masahiro Utumi; Masaaki Fujiyama, all of Odawara, Japan

[73] Assignee: Fuji Photo Film Co., Ltd., Ashigara, Japan

[21] Appl. No.: 82,905

[22] Filed: Oct. 9, 1979

Related U.S. Application Data

[63] Continuation of Ser. No. 936,045, Aug. 23, 1978, abandoned, which is a continuation of Ser. No. 829,493, Aug. 31, 1977, abandoned.

[30] Foreign Application Priority Data

Sep. 6, 1976 [JP] Japan ................................. 51-105773

[51] Int. Cl.$^3$ .............................................. B32B 17/08
[52] U.S. Cl. ....................................... 428/220; 427/40; 427/41; 427/54.1; 427/324; 428/323; 428/329; 428/330; 428/331; 428/339; 428/412; 428/413; 428/423.3; 428/423.7; 428/424.4; 428/424.6; 428/424.7; 428/425.1; 428/425.3; 428/425.5; 428/425.8; 428/425.9; 428/458; 428/463; 428/506; 428/508; 428/522
[58] Field of Search ................. 427/131, 40, 41, 54.1, 427/324, 322; 428/900, 323, 329, 330, 331, 339, 412, 413, 423.3, 423.7, 424.4, 424.6, 424.7, 425.1, 425.3, 425.5, 425.8, 425.9, 458, 463, 506, 508, 522, 538, 539

[56] References Cited

U.S. PATENT DOCUMENTS 4,047,232  9/1977  Hisagen et al. ...................... 428/900

FOREIGN PATENT DOCUMENTS 47-15623  5/1967  Japan .

Primary Examiner—Bernard D. Pianalto
Attorney, Agent, or Firm—Armstrong, Nikaido, Marmelstein & Kubovcik

[57] ABSTRACT

The present invention relates to a leader or trailer tape for a magnetic tape, which comprises a plastic support member and, on one side thereof, a laminated coating consisting of at least (1) an electrically conductive layer as a first layer and (2) a layer containing mainly a pigment and a binder as a second layer.

12 Claims, 3 Drawing Figures (a)

(b)

LEADER OR TRAILER TAPE FOR A MAGNETIC TAPE

This is a continuation of prior application Ser. No. 936,045 filed Aug. 23, 1978, and now abandoned. Application Ser. No. 936,045 is a continuation of prior application Ser. No. 829,493 filed Aug. 31, 1977, now abandoned.

BACKGROUND OF THE INVENTION

1. Field of the Invention

The present invention relates to an improvement in a leader tape or trailer tape for a magnetic tape and more particularly, it is concerned with a novel structure of a leader tape or trailer tape situated at the head portion or tail portion or, if necessary, intermediate portion of a long tape for magnetic recording such as video tapes, memory tapes or audio tapes.

2. Description of the Prior Art

It has hitherto been considered that the phenomenon of drop out occurring in a magnetic tape section is mainly due to the magnetic tape itself, but it has been found by our studies that this drop out is due to the leader tape and, when the surface electric resistance or electrostatic charge potential of the leader is low, the drop out is decreased. It has also been found that clogging of a rotating video head is due to a leader or trailer tape in addition to a magnetic tape. As the antistatic treatment of a tape-shaped material, it has been proposed (1) to coat the surface thereof with an antistatic agent and (2) to lower the electric resistance of the whole of layers.

With respect to the leader tape or trailer tape, there have hitherto been made various proposals, for example, comprising (1) providing a metallic vapor deposition in the form of a stripe (Japanese Utility Model Publication No. 14349/1971), (2) matting one or both sides of a base (Japanese Utility Model Publication No. 42726/1974) and (3) providing a coating layer containing 50 to 800 parts of a pigment having a grain size of 4 microns or less per 100 parts of a binder (Japanese patent application (OPI) Nos. 40504/1974 and 67603/1974). Above all, the proposal (3) is more preferable, but still has the following disadvantages: (1) The surface electric resistance or electrostatic charge potential cannot be lowered, (2) Head clogging occurs and (3) Blocking occurs at a high temperature and high humidity.

SUMMARY OF THE INVENTION

It is an object of the invention to provide a leader tape or trailer taper for a magnetic tape.

It is another object of the invention to provide an improved leader tape or trailer tape whereby the above described disadvantages of the prior art are overcome.

It is a further object of the invention to provide a leader or trailer tape for a magnetic tape, whereby increase of drop outs by repeated use can be suppressed.

These objects can be attained by a leader or trailer tape for a magnetic tape, which comprises a plastic support member and, on one side thereof, a laminated coating consisting of at least (1) an electrically conductive layer as a first layer and (2) a layer containing a pigment and binder as a second layer.

BRIEF DESCRIPTION OF THE DRAWING

The accompanying drawings are to illustrate the principle and merits of the invention in greater detail.

DETAILED DESCRIPTION OF THE INVENTION

We, the inventors, have hitherto made efforts to overcome the disadvantages of leader tapes or trailer tapes in the prior art, as described above, and consequently have reached the present invention. That is to say, the present invention provides a leader or trailer tape for a magnetic tape, which comprises a plastic support member and, on one side thereof, a coating multi-layer consisting of at least (1) an electrically conductive layer having a surface electric resistance of at most $10^{10} \Omega/sq$ as a first layer and (2) a layer containing mainly a pigment and binder as a second layer with a pigment to binder ratio of 6 to 1–0.5 to 1, the second layer being provided on the first layer.

Figure 1:
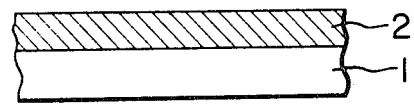
FIG. 1 is a cross sectional view of a leader tape of the prior art.
Figure 2:
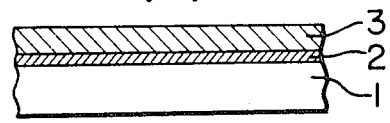
FIG. 2 (a) is a cross sectional view of a leader tape as one embodiment of the present invention and FIG. 2 (b) is a cross sectional view of a leader tape as another embodiment of the present invention.
Figure 2:
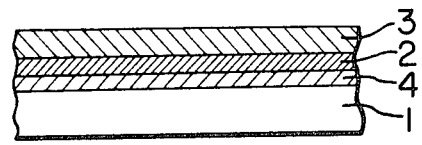

A leader tape of the prior art and a leader tape of the present invention, in cross section, are respectively shown in FIG. 1 and FIG. 2. The leader of the prior art as shown in FIG. 1 consists of a support base 1 and coating layer 2. The leader shown in FIG. 2 (a) as one embodiment of the invention consists of a base 1, first layer (electrically conductive layer) 2 and second layer (protective layer) 3 and the leader shown in FIG. 2 (b) as another embodiment of the present invention consists of a base 1, undercoated layer 4, electrically conductive layer 2 and protective layer 3.

The support used in the present invention may be same as or different from that of a magnetic tape and can be chosen from various plastics, for example, polyesters such as polyethylene terephthalate and polyethylene naphthalate, polyolefins such as polyethylene and polypropylene, cellulose derivatives such as cellulose triacetate and cellulose diacetate, vinyl-type resins such as polyvinyl chloride, polycarbonates and the like. The thickness of the support ranges from a thickness substantially same as that of a magnetic tape to a thickness of 20 times as much as that of a magnetic tape and preferably from 4 to 200 microns.

In the leader or trailer tape of the present invention, an undercoated layer is not particularly required, but it is desirable to use such as undercoated layer as commonly employed in magnetic tapes. In general, one or more of amorphous polyester resins, polyvinyl chloride acetate resins, linear saturated high molecular polyester resins and polyurethane resins or mixtures thereof with hard binders such as polycarbonates are dissolved in organic solvents and coated onto support bases to give a thickness of about 1 micron on dry base. As another method, a base surface can be subjected to an activation treatment such as by using acids or alkalies, by sandblasting or by irradiating corona discharge or ultraviolet rays.

The electrically conductive layer as a first layer according to the present invention is provided preferably by applying an electrically conductive resin with a surface electric resistance of $1 \times 10^{10} \Omega/sq$ or less, in particular, $1 \times 10^{3} \Omega/sq$ or less (in the case of applying a single electrically conductive resin to a support of polyethylene terephthalate). As the electrically conductive resins, there can be used polycationic resins and quaternary ammonium resins, for example,

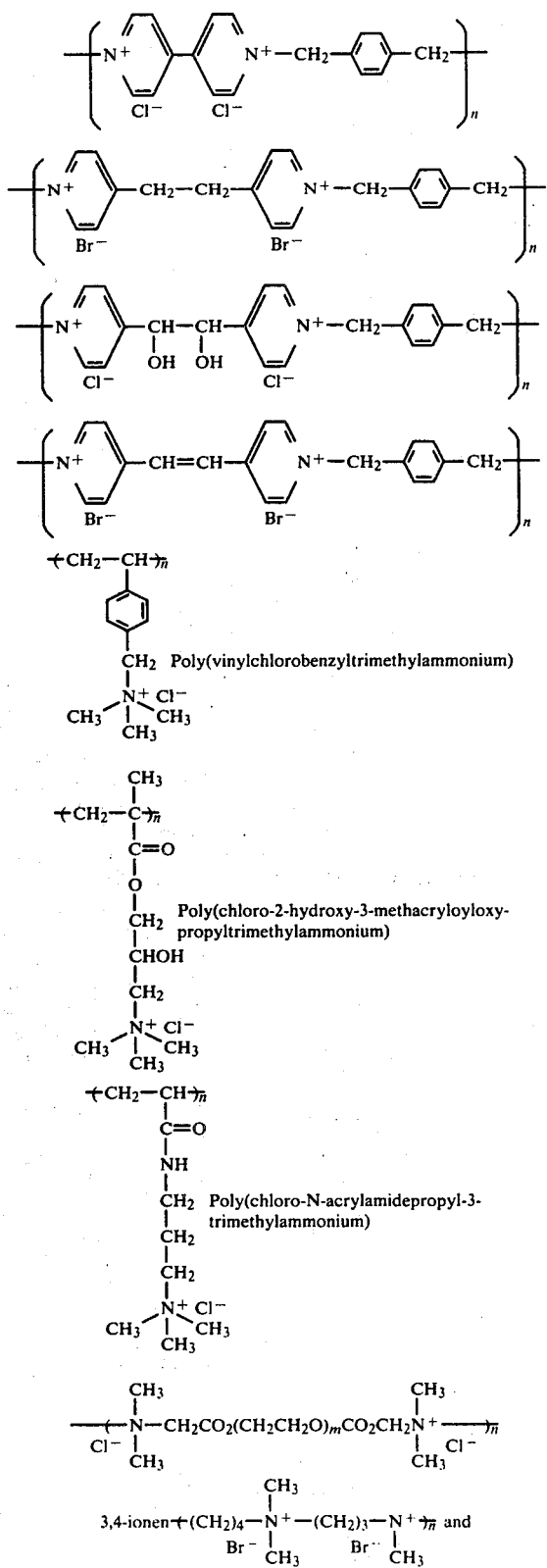

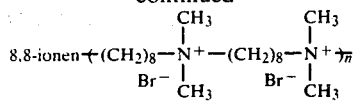

Instead of this electrically conductive resin, a mixture of a cationic surfactant and plastic resin can be used. In this case, however, the surface electric resistance tends to vary with the passage of time to a greater extent as compared with the former case. The thickness of the first layer is ordinarily 0.1 to 5 microns, preferably 0.2 to 2 microns.

The pigment used in the second layer of the leader or trailer tape according to the present invention is generally chosen from, for example, white pigments such as white lead, zinc white, zinc sulfide, basic lead sulfate, antimony white, zirconium oxide, barium metaborate, Pattinson White ($PbCl_2 \cdot Pb(OH)_2$), manganese white, lithophone, titanium oxide, lead sulfate, lead silicate, calcium plumbate, tin oxide and tungsten white and extenders such as barium sulfate, barium carbonate, precipitated calcium carbonate, chalk, alumina white, silica, talc, calcium silicate, precipitated magnesium carbonate, bentonite, slaked lime, precipitated barium sulfate, Paris white, gypsum, clay, silica white, asbestine, magnesium carbonate, satin white, magnesia and strontium white. The white pigment is generally used in a proportion of 10% by weight or less of the extender. The extender has generally a grain size of 0.02 to 10 microns, preferably, 0.05 to 3 microns and the white pigment has generally a grain size smaller than that of the extender or a grain size of 5 microns or less, preferably 2 microns or less. This pigment must have whiteness so as to raise the percent photo-transmission of the leader or trailer tape, whereby the position of the leader or trailer can be detected. As the binder for the second layer, there are used thermoplastic resins such as vinyl chloride/vinyl acetate copolymers, vinyl chloride/vinylidene chloride copolymers, polyacrylic acid esters, acrylic acid ester/acrylonitrile copolymers, cellulosic resins and polyurethane resins and thermosetting resins such as phenol resins and epoxy resins. The white pigment/resin ratio by weight is generally 6/1 to 0.5/1, Zreferably 4/1 to 1/1. The thickness of the second layer is generally 1 to 10 microns, preferably 1 to 6 microns.

In the leader or trailer tape of the present invention, the materials for the first layer (electrically conductive layer) and second layer (pigment, binder) should be chosen so as to give a percent photo-transmission of 20 to 90%, preferably 50 to 85% based on the formula for the percent photo-transmission ($Ls/Lo \times 100$) defined hereinafter. If the percent photo-transmission is less than 20%, the photo-transmission is inadequate. This percent photo-transmission can suitably be chosen within the above described range depending on the use of the tape, for example, video tape recorders, computer memory tape recorder, audio tape recorder, etc.

The following effects or advantages can be given by the use of the leader or trailer tape according to the present invention:

(1) A rotating video head is free from clogging.

(2) There is no blocking at a high temperature and high humidity.

(3) The surface electric resistance and electrostatic charge potential are lowered.

(4) Because of the above described effects (1) and (3), drop outs are not so increased even by repeated use.

(5) The leader or trailer tape, having a sufficient percent photo-transmission, can readily be detected by the percent photo-transmission method.

The following examples are given in order to illustrate the present invention without limiting the same. It will be obvious to one skilled in the art that various changes and modifications can be made in the components, ratios, operational order and the like without departing from the spirit of the present invention.

EXAMPLE 1

A polyethylene terephthalate film with a thickness of 36 microns was coated with an amorphous polyester resin to give a coating thickness of 0.5 micron on dry base and dried. The thus undercoated film was then coated with the following first layer composition, dried, coated with the following second layer composition, dried, subjected to a calendering treatment as in the ordinary magnetic tape producing process and cut in a width of ¾ inch. Sample Nos. 1 to 7 prepared in this way, in which the thickness of the first layer and second layer were varied, were loaded in a U-matic cassette of ¾ inch in width manufactured by Sony Corp. as a leader and trailer tape and subjected to assessment of various properties:

| Composition of First Layer | |
| --- | --- |
| Electrically Conductive Resin (Polyvinyl-benzyltrimethylammonium Chloride) | 50 g |
| Solvent (Methanol and Methyl Ethyl Ketone 2/1) | 1.5 kg |
| Composition of Second Layer | |
| Vinyl Chloride/Vinyl Acetate Copolymer | 47 g |
| Pigment (Calcium Carbonate having a mean grain size of 0.1 μ) | 200 g |
| Hardening Agent (Triisocyanate) | 28 g |
| Additives (Lecitin, Silicone Oil) | 7 g |

COMPARATIVE EXAMPLE 1

A polyethylene terephthalate film base with a thickness of 36 microns was provided with an undercoated layer in an analogous manner to Example 1, coated with a single layer composed of a blend of the compositions of the first layer and second layer used in Example 1, dried and then subjected to a calendering treatment.

Composition of Blend

| | |
| --- | --- |
| Vinyl Chloride/Vinyl Acetate Copolymer | 32 g |
| Pigment (Calcium Carbonate having a mean grain size of 0.1 μ) | 100 g |
| Electrically Conductive Acrylic Resin | 25 g |
| Hardening Agent (Triisocyanate) | 17 g |
| Additives (Lecitin, Silicone Oil) | 7 g |

The thus resulting Sample 8 was subjected to assessment in an analogous manner to Example 1.

TABLE 1

| Sample No. | Thickness of First Layer (μ) | Thickness of Second Layers (μ) | Head Clogging | Drop Out Increasing Ratio | Surface Electric Resistance (Ω/sq) | Blocking | Static Charge Potential (V) | Percent photo-transmission (%) |
| --- | --- | --- | --- | --- | --- | --- | --- | --- |
| 1 | 0 | 4.5 | No (some instantanous clogging) | 14.8 | $4 \times 10^{12}$ | No | 3000 | 81 |
| 2 | 0.3 | 4.2 | No | 1.3 | $1.2 \times 10^9$ | No | 70 | 80.5 |
| 3 | 0.5 | 4.0 | No | 1.2 | $7 \times 10^8$ | No | 20 | 80 |
| 4 | 1.0 | 3.5 | No | 1.1 | $4 \times 10^8$ | No | 10 | 78 |
| 5 | 2.0 | 2.5 | No | 1.1 | $2 \times 10^8$ | No | 10 or less | 75 |
| 6 | 3.5 | 1 | No | 1.1 | $9 \times 10^7$ | No | 10 or less | 72 |
| 7 | 4.5 | 0 | Found | — | $7 \times 10^7$ | Found | 10 or less | 70 |
| 8 | 4.5 | — | Found | 2.2 | $9 \times 10^9$ | Found | 450 | 85 |

Various assessments were carried out as follows:

(1) Drop out increasing ratio

VTR: VO-1700 A made by Sony Corp.
Tape: ¾ inch cassette tape for U-matic VTR

Instead of the leader and trailer attached to a ¾ inch cassette tape for U-matic VTR, various leader and trailer tapes, Sample Nos. 1 to 8 were combined and subjected to recording or reproducing while counting drop outs. Calculation of the drop out increasing ratio was carried out by the following relation:

$$\text{Drop Out Increasing Ratio} = D_{50}/D_1$$

in which $D_1$ is the number of drop outs per minute (more than ⅓ H) during recording and reproducing at the first time and $D_{50}$ is the number of drop outs per minute during recording and reproducing at the fiftieth time.

(2) Surface electric resistance

A sample of ¾ inch in length and ¾ inch in width was subjected to measurement using a Takeda Riken-TR-8651 Electro Meter.

(3) Blocking

A leader tape of ¾ inch in width was wound round a glass tube of 36 mm in diameter under a load of 4 Kg and allowed to stand at 45° C. and 80% RH for 24 hours. Thereafter, adhesion between the leader tapes was visually examined.

(4) Electrostatic charge potential

When the surface of a leader tape was rubbed with a nylon cloth 15 times, the electrostatic charge potential was measured by means of an electrostatic charge potentiometer, SSV II-40 made by Kawaguchi Denki Kogyo.

(5) Photo-transmission

Light source: tungsten lamp
Light receiving section: phototransistor

The percent photo-transmission was calculated by the following relation:

$$\text{Percent Photo-transmission} = (L_s/L_o) \times 100(\%)$$

in which $L_o$ is the quantity of light in a case where there is no leader tape, nor trailer tape and $L_s$ is the quantity of light in a case where a leader tape and trailer tape are inserted.

It will clearly be understood from the results of Table 1, Sample Nos. 1 to 7 that, when the first layer has a thickness of 0.3 micron or more, all the properties, that is, drop out increasing ratio, head clogging, surface electric resistance, electrostatic charge potential, etc. are excellent and thus the effects or merits of the present invention can be achieved with a thickness of the first layer of 0.1 micron or more. When the compositions of the first layer and second layer are blended and coated in the form of a single layer as in the case of Sample No. 8, the head clogging, drop out increasing ratio, surface electric resistance and blocking are inferior to those of the present invention.

What is claimed is:

1. A leader or trailer tape for a magnetic tape and which consists of a plastic support member and, on one side thereof, a laminated coating consisting of (1) as a first layer, an electrically conductive layer having a thickness of 0.1 to 5 microns and having a surface electric resistance of at most $10^{10} \Omega$/sq, said electrically conductive layer being an electrically conductive resin selected from the group consisting of polycationic resins, quaternary ammonium resins and mixtures of cationic surfactants and plastic resins, and (2) a protective layer having a thickness of 1 to 10 microns covering said first layer and consisting essentially of a pigment and a binder as a second layer with a pigment to binder ratio of 6 to 1–0.5 to 1, said pigment having a grain size of 0.02 to 10 microns, the percent photo-transmission of said leader or trailer tape being 20 to 90%.

2. The leader or trailer tape for a magnetic tape as claimed in claim 1, wherein the plastic support member is of at least one material selected from the group consisting of polyesters, polyolefins, cellulose derivatives, vinyl resins and polycarbonates.

3. The leader or trailer tape for a magnetic tape as claimed in claim 1, wherein the plastic support member has a thickness of 4 to 200 microns.

4. The leader or trailer for a magnetic tape as claimed in claim 1, wherein the pigment is at least one material selected from the group consisting of white lead, zinc white, zinc sulfide, basic lead sulfate, antimony white, zirconium oxide, barium metaborate, Pattinson White, manganese white, lithophone, titanium oxide, lead sulfate, lead silicate, calcium plumbate, tin oxide, tungsten white, barium sulfate, barium carbonate, precipitated calcium carbonate, chalk, alumina white, silica, talc, calcium silicate, precipitated magnesium carbonate, bentonite, slaked lime, precipitated barium sulfate, Paris white, gypsum, clay, silica white, asbestine, magnesium carbonate, satin white, magnesia and strontium white.

5. The leader or trailer tape for a magnetic tape as claimed in claim 1, wherein the binder is at least one material selected from the group consisting of thermoplastic resins and thermosetting resins.

6. The leader or trailer tape for a magnetic tape as claimed in claim 5, wherein the thermoplastic resins are vinyl chloride/vinyl acetate copolymers, vinyl chloride/vinylidene chloride copolymers, polyacrylic acid esters, acrylic acid ester/acrylonitrile copolymers, cellulosic resins and polyurethane resins.

7. The leader or trailer tape for a magnetic tape as claimed in claim 5, wherein the thermosetting resins are phenol resins and epoxy resins.

8. The leader or trailer tape for a magnetic tape as claimed in claim 1, wherein the plastic support member is provided with an undercoated layer.

9. The leader or trailer tape for a magnetic tape as claimed in claim 8, wherein the undercoated layer is formed by dissolving one or more of amorphous polyester resins, polyvinyl chloride acetate resins, linear saturated high molecular polyester resins and polyurethane resins or mixtures thereof with polycarbonates in organic solvents and coating to give a thickness of about 1 micron on dry base.

10. The leader or trailer tape for a magnetic tape as claimed in claim 8, wherein the plastic support member is previously subjected to a surface activating treatment.

11. The leader or trailer tape for a magnetic tape as claimed in claim 10, wherein the surface activating treatment is carried out by using an acid or alkali, sandblasting or irradiating corona discharge or ultraviolet rays.

12. The leader or trailer tape for a magnetic tape as claimed in claim 1, wherein the percent photo-transmission is adjusted to 50 to 85%.

* * * * *